United States Patent
Guo et al.

(10) Patent No.: US 12,456,194 B2
(45) Date of Patent: Oct. 28, 2025

(54) METHODS FOR IDENTIFYING AND USING CELL BEHAVIOR IN DRUG SCREENING AND DIAGNOSIS

(71) Applicant: Indiana University Research and Technology Corporation, Bloomington, IN (US)

(72) Inventors: Feng Guo, Bloomington, IN (US); Hongwei Cai, Bloomington, IN (US); Zheng Ao, Bloomington, IN (US)

(73) Assignee: Indiana University Research and Technology Corporation, Bloomington, IN (US)

( * ) Notice: Subject to any disclaimer, the term of this patent is extended or adjusted under 35 U.S.C. 154(b) by 318 days.

(21) Appl. No.: 18/268,730

(22) PCT Filed: Dec. 17, 2021

(86) PCT No.: PCT/US2021/064113
§ 371 (c)(1),
(2) Date: Jun. 21, 2023

(87) PCT Pub. No.: WO2022/140191
PCT Pub. Date: Jun. 30, 2022

(65) Prior Publication Data
US 2024/0046462 A1    Feb. 8, 2024

Related U.S. Application Data

(60) Provisional application No. 63/129,042, filed on Dec. 22, 2020.

(51) Int. Cl.
*G06T 7/00* (2017.01)

(52) U.S. Cl.
CPC .. *G06T 7/0012* (2013.01); *G06T 2207/20084* (2013.01); *G06T 2207/30024* (2013.01); *G06T 2207/30096* (2013.01)

(58) Field of Classification Search
CPC ......... G06T 7/0012; G06T 2207/20084; G06T 2207/30004; G06T 2207/30024; G06T 2207/30096
See application file for complete search history.

(56) References Cited

U.S. PATENT DOCUMENTS

| | | | |
|---|---|---|---|
| 2015/0004253 A1* | 1/2015 | Dieu-Nosjean | G01N 33/57415 424/649 |
| 2019/0279742 A1 | 9/2019 | Boucher et al. | |
| 2020/0388029 A1 | 12/2020 | Saltz et al. | |

FOREIGN PATENT DOCUMENTS

WO    2020/208571 A1    10/2020

OTHER PUBLICATIONS

International Search Report and Written Opinion received for PCT Patent Application No. PCT/US2021/064113, mailed on Mar. 10, 2022, 9 pages.

* cited by examiner

*Primary Examiner* — Kent Yip
(74) *Attorney, Agent, or Firm* — Faegre Drinker Biddle & Reath LLP

(57) ABSTRACT

Embodiments of the present disclosure relate generally to methods used to perform diagnosis and drug screening because the method includes an algorithm that is able to obtain images of immune cells in 3D tissue cultures, analyze such images to create immune cell infiltration maps, automatically score and identify drugs or agents that can be potentially clinically beneficial.

16 Claims, 7 Drawing Sheets

B16F10_DLS_Score (0-6)

| Score | Treatment |
|---|---|
| 0 | Negative_control |
| 1 | No_treatment |
| 3 | Anti-PD1 |
| 2 | 3-amino Benzamide |
| 0 | SB939 |
| 0 | 4-iodo-SAHA |
| 0 | Sirtinol |
| 1 | C646 |
| 0 | Tubastatin A (trifluoroacetate salt) |
| 0 | Garcinol |
| 0 | Ellagic Acid |
| 3 | Apicidin |
| 1 | HC Toxin |
| 3 | (−)-Neplanocin A |
| 1 | Cl-Amidine (trifluoroacetate salt) |
| 0 | F-Amidine (trifluoroacetate salt) |
| 0 | JGB1741 |
| 1 | coumarin-SAHA |
| 0 | I-BET762 |
| 0 | Phthalazinone pyrazole |
| 0 | Isoliquiritigenin |
| 0 | CCG-100602 |
| 2 | CAY10669 |
| 3 | Zebularine |
| 1 | Rucaparib (phosphate) |
| 0 | GSK4112 |
| 1 | Octyl-α-ketoglutarate |
| 0 | Daminozide |
| 0 | GSK-J1 (sodium salt) |
| 0 | GSK-J2 (sodium salt) |
| 2 | CI-994 |
| 0 | CPTH2 (hydrochloride) |
| 0 | Tenovin-6 |
| 2 | CAY10603 |
| 1 | M 344 |
| 2 | Oxamflatin |
| 3 | MS-275 |
| 0 | RG-108 |
| 0 | 2',3',5'-triacetyl-5-Azacytidine |
| 1 | UNC0224 |
| 0 | Chidamide |
| 0 | SIRT1/2 Inhibitor IV |
| 2 | SGC-CBP30 |
| 0 | (R)-PFI-2 (hydrochloride) |
| 0 | PFI-3 |
| 1 | OTX015 |
| 6 | GSK-LSD1 |
| 1 | DMOG |
| 0 | CAY10398 |
| 5 | RSC-133 |
| 1 | BML-210 |
| 0 | Piceatannol |
| 1 | SAHA |

UN-KC6141_DLS_Score (0-8)

| Score | Treatment |
|---|---|
| 0 | Negative_Control |
| 1 | No_treatment |
| 5 | Anti-PD1 |
| 3 | 3-amino Benzamide |
| 1 | SB939 |
| 0 | PCI 34051 |
| 0 | 4-iodo-SAHA |
| 0 | Sirtinol |
| 0 | C646 |
| 0 | Tubastatin A (trifluoroacetate salt) |
| 1 | Ellagic Acid |
| 0 | Scriptaid |
| 1 | Apicidin |
| 5 | UNC0321 (trifluoroacetate salt) |
| 6 | Suramin (sodium salt) |
| 5 | GSK-J2 (sodium salt) |
| 1 | Anacardic Acid |
| 5 | AGK2 |
| 5 | CAY10603 |
| 4 | 2',3',5'-triacetyl-5-Azacytidine |
| 4 | Pyroxamide |
| 4 | WDR5-0103 |
| 3 | EPZ005687 |
| 3 | SGC0946 |
| 2 | AK-7 |
| 2 | GSK343 |
| 3 | Bromosporine |
| 1 | GSK2801 |
| 0 | SIRT 1/2 Inhibitor IV |
| 2 | I-CBP112 (hydrochloride) |
| 3 | SGC-CBP30 |
| 1 | UNC0642 |
| 1 | UNC1999 |
| 4 | HPOB |
| 3 | 2-hexyl-4-Pentynoic Acid |
| 0 | PFI-3 |
| 0 | CAY10683 |
| 1 | GSK126 |
| 0 | CPI-203 |
| 2 | 6-Thioguanine |
| 1 | Tubastatin A |
| 1 | 3,3'-Diindolylmethane |
| 0 | OTX015 |
| 1 | 5-Methylcytidine |
| 1 | AGK7 |
| 3 | 5-Methyl-2'-deoxycytidine |
| 4 | MC 1568 |
| 1 | α-Hydroxyglutaric Acid (sodium salt) |
| 0 | S-(5'-Adenosyl)-L-methionine (tosylate) |
| 8 | GSK-LSD1 |
| 3 | EPZ5676 |
| 2 | MC 1568 |
| 3 | α-Hydroxyglutaric Acid (sodium salt) |
| 1 | RVX-208 |

FIG. 6

METHODS FOR IDENTIFYING AND USING CELL BEHAVIOR IN DRUG SCREENING AND DIAGNOSIS

CROSS-REFERENCE TO RELATED APPLICATION

This application is a 371 U.S. National Phase Application of International PCT Application No. PCT/US2021/064113, filed Dec. 17, 2021, which claims priority to U.S. Provisional Application No. 63/129,042, filed on Dec. 22, 2020, the entire disclosures of which are incorporated herein by reference in their entirety.

TECHNICAL FIELD

The present disclosure relates generally methods used to perform drug screening and diagnosis because the method includes an algorithm that is able to obtain images of immune cells in 3D tissues, analyze such images to create immune cell infiltration maps, automatically score and identify drugs or agents that can be potentially clinically beneficial or directing clinical treatment selection.

BACKGROUND

Immunocytes, such as T cell, or which may be referred to as a T lymphocyte, are an essential part of the immune system. Specifically, T cells determine the body's particular immune response to antigens. Once activated by the antigen, a T cell becomes toxic and is referred to as a cytotoxic T cell, which recognize, attack and killing infected cells.

Cell behavior is a broad term used to describe the viability, distribution, morphology and translation of cells. The migration of T cells plays an important role in the T cells' effectiveness in killing infected cells. Although there exists an appreciation that understanding the precise mechanisms underlying T cell behavior can be leveraged to create novel therapeutic approaches, there currently does not exist an effective way to comprehensively analyze T cell behaviors.

Moreover, during tumor development, lymphocytes, such as cytotoxic T cells infiltrate the tumor and inhibit tumor progression. But due to immune evasion, which is the body's method of using pathogenic organisms to evade a host's immune system, tumors evolve to evade the body's immune surveillance system by downregulating antigens as well as secreting extracellular matrix (ECM) to physically limit lymphocyte infiltration. Increased tumor-infiltrating lymphocytes (TILs) have been shown to correlate with improved prognosis in many cancer types including breast, colorectal, ovarian, pancreatic cancers, and melanoma. For example, there is evidence demonstrating that the type, density, infiltration depth, clustering index as well as activation status of TIL inside solid tumors are crucial predictors of disease outcome. The presence of TIL in the tumor margin, as well as the center of solid tumors, yield the best disease outcome compared with those tumors with poor or only marginal TIL infiltration, thereby highlighting the clinical relevance of TIL number as well as infiltration depth inside solid tumors. Examples of TILs may include cytotoxic (CD8+) and helper (CD4+) T cells, as well a smaller proportion of B cell and NK cells, monocytes.

Recent development of cancer immunotherapy, such as immune checkpoint inhibitors (ICI) has brought hope to solid tumors treatment by removing the "brakes" on T cell-mediated anti-tumor immunity. However, patients' response to ICI drugs varies greatly with the overall objective response (OOR) rate ranging from <10% to ~40% in different cancer types. The limitation of ICI efficacy can be largely attributed to limited T cell infiltration in "cold tumors". Increasing T cell infiltration via drugs such as epigenetic modulators have been shown to enhance ICI treatment. Yet, systemic studies to uncover effective modulators of T cell infiltration as well as high-throughput screening (HTS) technologies to screen for such phenotype is lacking.

That is, having a better understanding of T cell migration will hopefully enhancing ways to increase T cell infiltration and their killing efficacy in solid tumors, including reducing immune evasion and T cell exhaustion while attacking solid tumor, particularly under hypoxia conditions. For example, currently known two-dimensional (2D) and three-dimensional (3D) models either focus only on whether the T cells are successful in killing the infected cells, or to the extent such models analyze T cell functionality and behaviors, intensive downstream analysis (e.g., Enzyme-Linked Immunosorbent Assay (ELISA), Real-Time Quantitative Reverse Transcription (qRT-PCR), Flow-Cytometry (FCM), etc.) is required and such modeling techniques are typically subjective. Moreover, known 2D and 3D models often only yield simple readouts such as T cell cytotoxicity and cytokine profiles. A systemic, reliable model to provide detailed information regarding both T cell infiltration as well as cytotoxicity is lacking, What is needed is a real-time, objective method to analyze T cell functionality in solid tumors, modeling tumor initiation, progression, metastasis and relapse, as well as modelling T cell infiltration and cytotoxicity.

SUMMARY

Examples disclosed herein may reduce some of the shortcomings associated with conventional techniques that model and analyze T cell behavior, migration, cytotoxicity and infiltration, particularly in tumors. The present disclosure describes a method for analysis of T cells' infiltration, function and exhaustion in fabricated tumors (e.g., cultured tissues). The tracks can be analyzed to identify the individual T cell's behavior with 3D tumor cultures, its infiltration into tumor culture, its killing of tumor cells, the speed of killing in relation to infiltration depth and time, and its exhaustion. The tracked behavior patterns can then be analyzed and recognized by a machine learning enabled algorithm, which has been trained by a dataset of clinical database of cancer patient to categorize and score T cell behavior and function for scoring drugs or treatment response for diagnosis or drug screening.

As the algorithm trained, the machine learning enabled algorithm automatically scores the TIL patterns and the TIL impact on disease outcomes. As such, the algorithm is able to be used in patient survival prediction or drug screening because the algorithm is able to analyze images of T cell's behavior within 3D tumor tissue to create T cell infiltration maps, automatically score and identify drugs or agents that can be potentially clinically beneficial. That is, the algorithm is able to score a TIL pattern, which correlates with patient survival prediction. One of the novel features of the algorithm is that it combines elements of a residual neural network, which has a convolutional network architecture, with a discrete survival time model to predict time-to-event data from tumor infiltrating lymphocytes (TILs) images. Another novel feature of the algorithm is that it applies a loss function to optimize algorithm between the predicted patient survival time and the actual survival time of the patient from clinical data, wherein the loss function is configured to minimize the negative mean log likelihood between the predicted survival time and the actual survival time via backpropagation to optimize model weights and biases. The output of the loss function is a survival time distribution for the subset(s) of TIL behavior infiltration features. wherein the survival time distribution represents the correlation between patient survival time and TIL behavior infiltration features or patterns of TIL behavior infiltration features.

Examples embodiments are as follows.

In an Example 1, a non-transitory computer readable medium having a computer program stored thereon for identifying and/or determining relationships and/or patterns between patient survival and one or more tumor infiltrating lymphocytes (TILs) within a tumor, the computer program comprising instructions for causing one or more processors to: receive a plurality of first images, wherein each of the plurality of first images comprises one or more TILs in a three-dimensional tumor tissue; receive actual patient survival time data associated with each of the plurality of first images; create a plurality of multi-color maps from the plurality of first images, wherein a first color represents the one or more TILs and a second color represents the three-dimensional tumor tissue; process a plurality of multi-color maps via a neural network, wherein the neural network identifies TIL features in each of the plurality of multi-color maps, creates a plurality of patterns of the TIL features, correlates actual survival time to the TIL features or patterns of features, and produce a survival time distribution for the TIL features or patterns TIL (behavior) features; calculate a predicted survival time using the neural network; and apply a loss function to optimize the neural network, wherein the loss function is configured to minimize a negative mean log likelihood between the predicted survival time and the actual survival time via backpropagation to optimize model weights and biases within the neural network and produce a modified survival time distribution for the TIL features of patterns TIL behavior features, wherein the modified survival time distribution represents a correlation between survival time and the TIL features or patterns of TIL features.

In an Example 2, a method for identifying and/or determining relationships and/or patterns between patient survival and one or more tumor infiltrating lymphocytes (TILs) within a tumor, the method comprising the steps of: receiving a plurality of images, wherein each of the plurality of images comprises one or more TILs in a three-dimensional tumor tissue; receiving patient survival time data associated with each of the plurality of images; creating a plurality of multi-color maps from the plurality of images, wherein first color represents the one or more TILs and the second color represents the three-dimensional tumor tissue; performing analysis of the plurality of multi-color maps using a neural network to extract a plurality of TIL infiltration features from the plurality of multi-color maps; and processing a plurality of multi-color maps via a neural network, wherein the neural network identifies TIL features in each of the plurality of multi-color maps, creates a plurality of patterns of the TIL features, correlates actual survival time to the TIL features or patterns of features, and produce a survival time distribution for the TIL features or patterns TIL (behavior) features; calculating a predicted survival time using the neural network; and applying a loss function to optimize the neural network, wherein the loss function is configured to minimize a negative mean log likelihood between the predicted survival time and the actual survival time via backpropagation to optimize model weights and biases within the neural network and produces a modified survival time distribution for the TIL features of patterns TIL behavior features, wherein the modified survival time distribution represents a correlation between survival time and the TIL features or patterns of TIL features.

In an Example 3, such that the method of Example 2 further comprises calculating a predicted patient survival time score based on the survival time distribution.

In an Example 4, such that the method of Example 3 further comprises the step of classifying the score into one of a plurality of classifications.

In an Example 5, such that the method of Example 4 further comprises the step of assigning a value corresponding to classification of the score.

In an Example 6, such that the method of Example 5 further comprises the step of summing the values for a predetermined number of the images associated with the one or more TILs, thereby calculating a final score representative of the impact of the one or more TILs.

In an Example 7, a non-transitory computer readable medium having a computer program stored thereon for performing drug screening, the computer program comprising instructions for causing one or more processors to: receive a plurality of images, wherein each of the plurality of images comprises one or more immunocytes in a tissue culture; create a plurality of multi-color maps from the plurality of images, wherein first color represents the one or more immunocytes and the second color represents the tissue culture; perform analysis of the plurality of multi-color maps using a neural network to extract a plurality of immunocyte infiltration features from the plurality of multi-color maps, wherein the neural network comprises a survival time distribution representative of a relationship between a survival time of a patient and a subset of the plurality of immunocyte infiltration features or a pattern of the subset of the plurality of immunocyte infiltration features, wherein the neural network comprises weights and/or biases that have been assigned as a result of a loss function having minimized a negative mean log likelihood between a predicted time and an actual time via backpropagation, and calculate a predicted patient survival time of the patient based on a correlation between the plurality of immunocyte infiltration features from the plurality of multi-color maps and the survival time distribution.

In an Example 8, such that the non-transitory computer readable medium of Example 7, wherein the computer program further comprises instructions for calculating a predicted patient survival time score based on predicted patient survival time.

In an Example 9, such that the non-transitory computer readable medium of Example 8, wherein the computer program further comprises instructions for causing one or more processors to classify the predicted patient survival time score into one of a plurality of classifications.

In an Example 10, such that the non-transitory computer readable medium of Example 9, wherein the computer program further comprises instructions for causing one or more processors to assign a value corresponding to classification of the predicted patient survival time score.

In an Example 11, such that the non-transitory computer readable medium of Example 10, wherein the computer program further comprises instructions for causing one or more processors to sum the values for a predetermined number of the images associated with the one or more immunocyte infiltration features, thereby calculating a final score representative of the impact of the one or more immunocyte infiltration features.

In an Example 12, a method for performing drug screening, the method comprising the steps of: receiving a plurality of images, wherein each of the plurality of images comprises one or more immunocytes in a tissue culture; creating a plurality of multi-color maps from the plurality of images, wherein first color represents the one or more immunocytes and the second color represents the tissue culture; performing analysis of the plurality of multi-color maps using a neural network to extract a plurality of immunocyte infiltration features from the plurality of multi-color maps, wherein the neural network comprises a survival time distribution representative of a relationship between a survival time of a patient and a subset of the plurality of immunocyte infiltration features or a pattern of the subset of the plurality of immunocyte infiltration features, wherein the neural network comprises weights and/or biases that have been assigned as a result of a loss function having minimized a negative mean log likelihood between a predicted time and an actual time via backpropagation, and calculating a predicted patient survival time of the patient based on a correlation between the plurality of immunocyte infiltration features from the plurality of multi-color maps and the survival time distribution.

In an Example 13, such that the method of Example 12 further comprises the steps of: receiving two or more images, wherein each of the two or more images are representative of two immunocytes in a similar tissue culture, respectively; calculating the predicted patient survival time with respect to each of the two immunocytes; and identifying the greater of the predicted patient survival times.

In an Example 14, such that the method of Example 13 further comprises the step of calculating a predicted patient survival time score for each of the predicted patient survival times.

In an Example 15, such that the method of Example 14 further comprises the step of classifying each of the predicted patient survival time scores into respective classifications.

In an Example 16, such that the method of Example 15 further comprises the step of assigning a value corresponding to the classifications of the predicted patient survival time scores.

While multiple examples are disclosed, still other embodiments of the present disclosure will become apparent to those skilled in the art from the following detailed description, which shows and describes illustrative examples of the disclosure. Accordingly, the drawings and detailed description are to be regarded as illustrative in nature and not restrictive.

BRIEF DESCRIPTION OF THE DRAWINGS

FIG. 6 is an illustration of the scores of drug library in B16F10 and UN-KC6141 cell lines.

Figure 1:
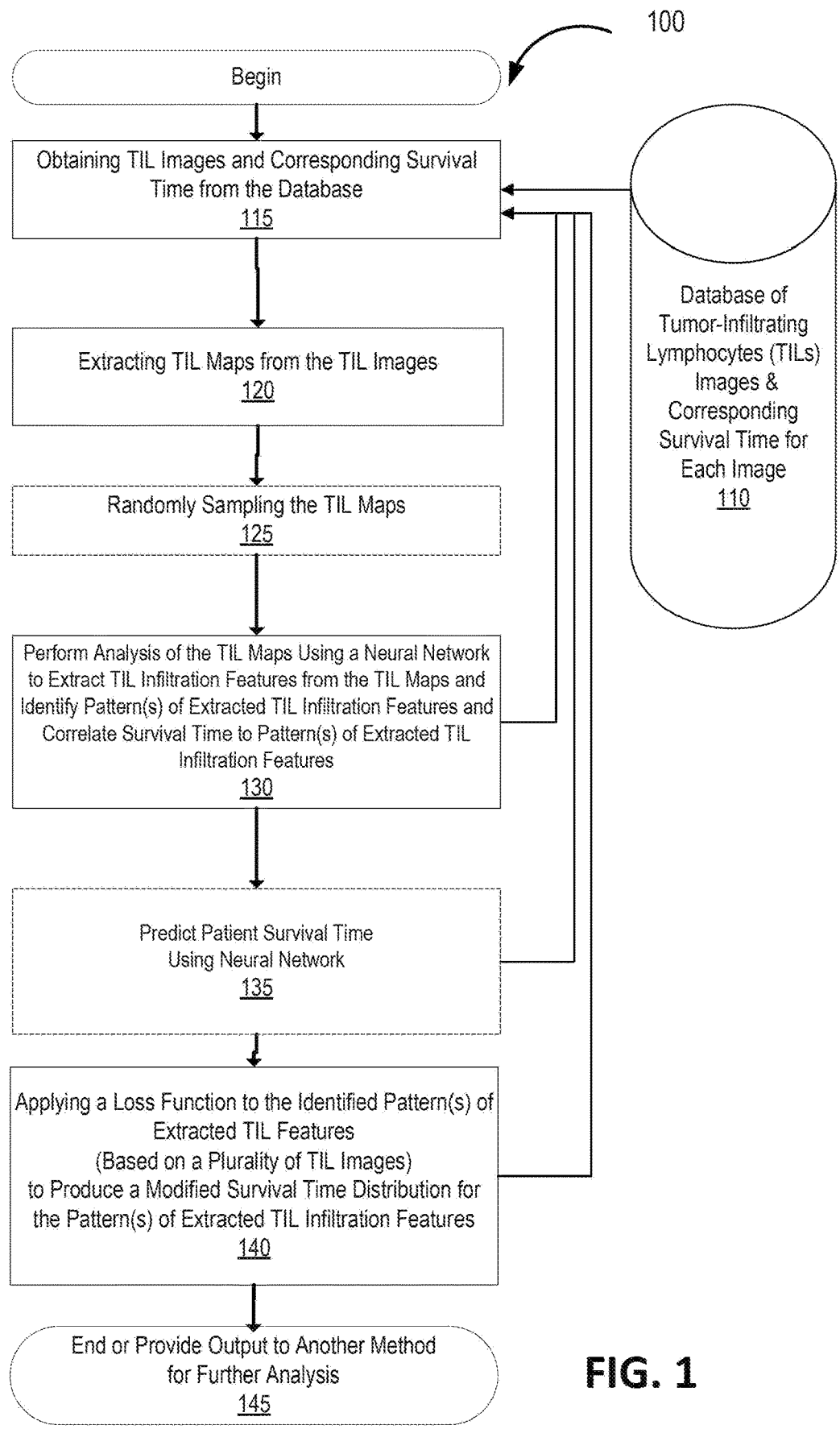
FIG. 1 is an illustration of a flow diagram for identifying and/or determining relationships and/or patterns between one or more tumor infiltrating lymphocytes (TILs) within a 3D tumor tissue and the survival time of patients over a period of time.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

As set forth above, embodiments disclosed herein, which are rooted in computer technology (e.g., machine learning) may reduce some of the shortcomings associated with conventional models that quantify the behavior of a consumer or a business.

Referring to FIG. 1, there is depicted a method 100 for identifying and/or determining relationships between patient survival (or survival time) and the behavior of one or more tumor infiltrating lymphocytes (TILs) within a 3D tumor. There are TIL images in the Cancer Genome Atlas (TCGA) database 110, which is located at https://gdc.cancer.gov/. Step 115 includes obtaining TIL images from the TCGA database. For example, TIL images and follow-up data of skin cutaneous melanoma (SKCM) can be obtained from the TCGA database 110.

The TCGA dataset 110 is a patient dataset with images of tumor slices and survival time data of each patient associated with such images. The TIL images of the TCGA data are the extracted TIL distribution from the patient tumor slices. The TIL images in the TCGA database are from different patient samples at different surgery time.

The algorithm of the present disclosure is first trained using the TCGA data and then the trained algorithm is transferred and applied to other portions of the database 105 from the same or other drug testing systems to score the drug outcome. The goal of the training is to learn and identify the correlation of TIL maps and/or the pattern of extracted behavioral characteristics of certain TIL infiltration features and/or a subset of TIL infiltration features that are representative of the more relevant TIL infiltration features indicative of the TIL behavioral characteristics and patient survival outcomes from the TCGA patient database, create a survival time distribution for such TIL infiltration features and/or a subset of TIL infiltration features, embed that correlation and/or survival time distribution into the algorithm, and to subsequently use the learned correlation and/or survival time distribution by applying the algorithm to predict patient survival or survival time, including scoring the drug outcomes in the drug testing system.

Figure 7:
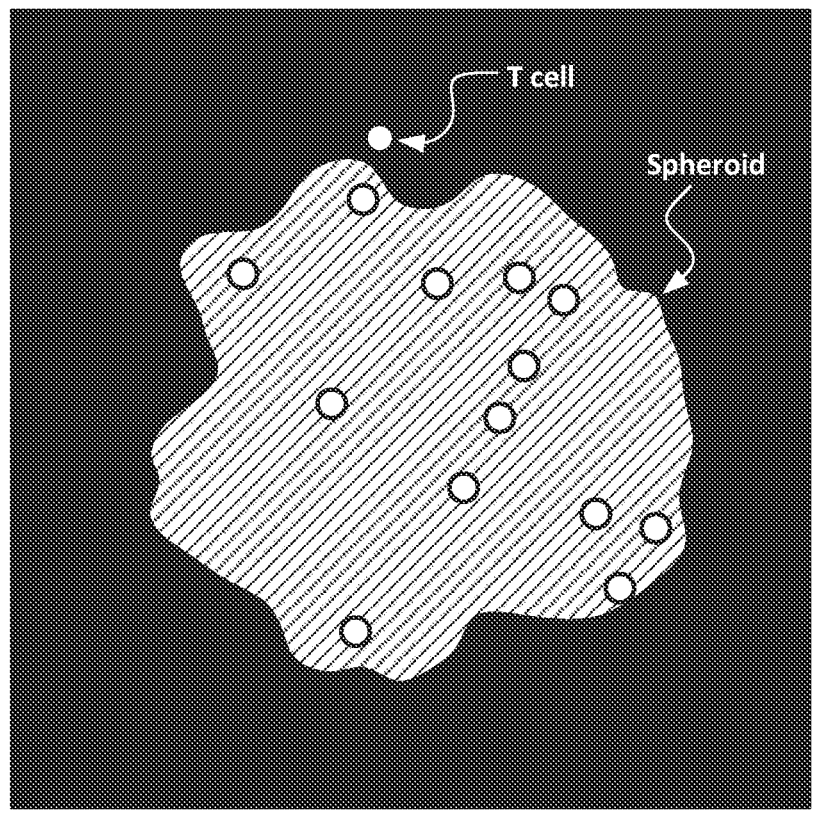
FIG. 7 is an exemplary multi-color map (represented as a black-and-white drawing for publication) in accordance with some embodiments disclosed herein.

Step 115 includes obtaining TIL images and corresponding TIL and/patient survival time data from the database 110. Step 120 includes extracting TIL maps from the TIL images. For example, TIL maps were extracted from the TIL images by digitalizing hematoxylin and eosin stain or hematoxylin and eosin stain (often abbreviated as: H&E stain or HE stain) images into a multi-color map, wherein the multi-color map comprises red, which represent lymphocytes (T cells), and blue, which represent the tumor (spheroid). In some examples, any other combination of colors may be used instead of red and blue. An example of one such multi-color map is shown in FIG. 7, represented as a black-and-white drawing for publication. It is to be understood that the map may have more than two colors in some examples. The background of the image may be black, white, transparent, or any other suitable color different from the colors already used to represent the lymphocytes and the tumor. It is to be understood that any shapes other than circles may be used to represent the lymphocytes, as suitable. Step 125 includes the optional step of randomly sampling the TIL maps, which are bi-color, digitized maps of the TIL images. Continuing to refer to FIG. 1, step 130 of method 100 includes performing pattern analysis of TIL maps using a convolutional neural network to extract TIL infiltration features from TIL maps. That is, step 130 includes perform analysis of the TIL maps using a neural network to extract TIL infiltration features from the TIL maps, identify pattern(s) of extracted TIL infiltration features, and correlate the survival time to the pattern(s) of extracted TIL infiltration features.

Continuing to refer to FIG. 1, step 135 of method 100 includes learning the relationship(s) between patient outcomes, such as survival time, and the image-extracted features with fully connected neural networks. Fully connected layers perform additional transformations on these extracted features, and then, a final discrete time model layer outputs a prediction of patient survival time likelihood over discrete time points. The interconnection weights are trained by comparing the survival time likelihood predicted by the network with time-to-event outcomes using a backpropagation technique to optimize the negative mean log-likelihood of the network.

Figure 4:
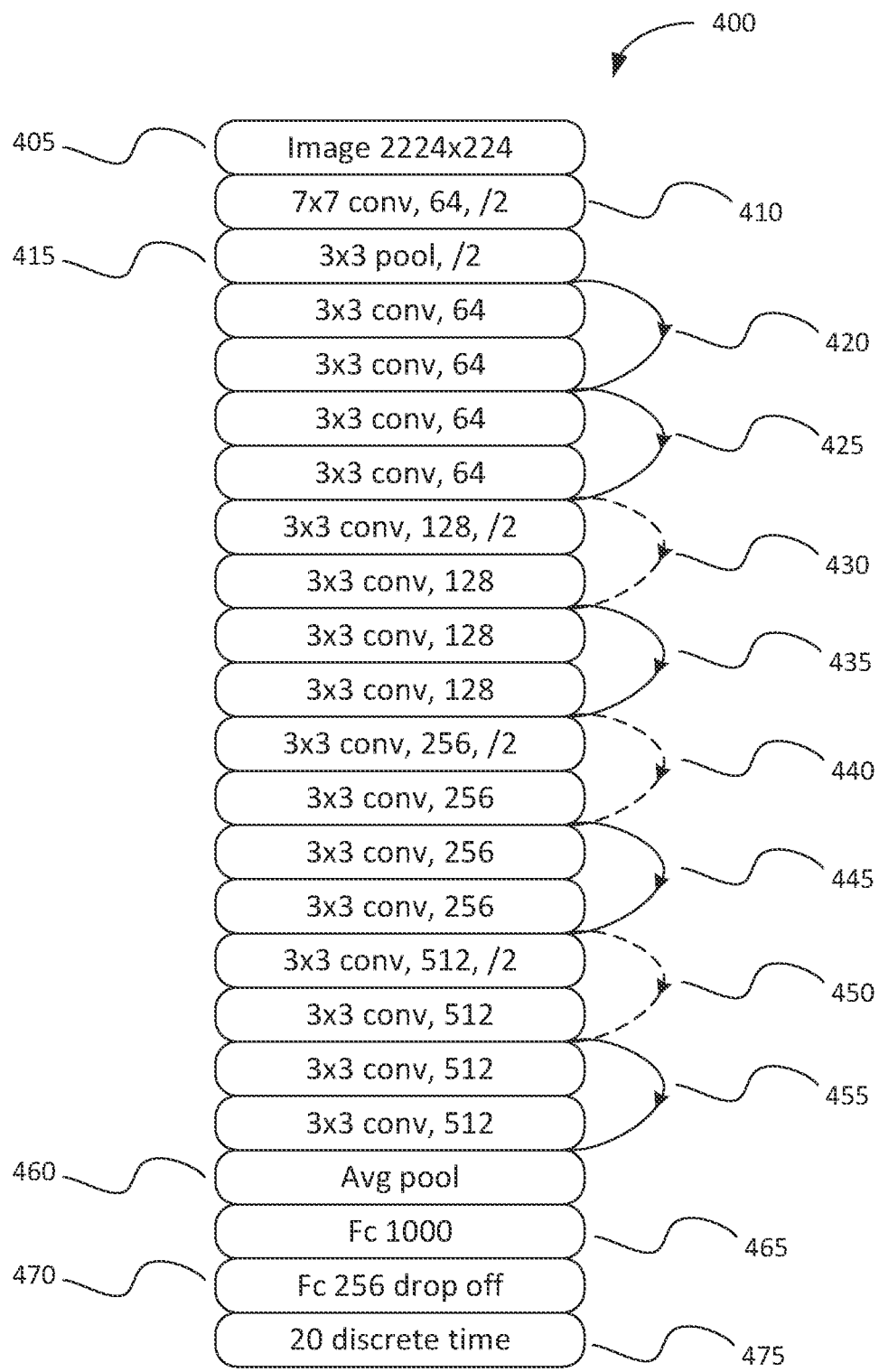
FIG. 4 is an illustration of an architecture of an algorithm having a neural network combined with a discrete survival time model to predict time-to-event data from TILs images.

As seen in FIG. 4, the algorithm of the present disclosure includes a residual neural network, which may have a convolutional network architecture, objectively predicts time-to-event data from tumor infiltrating lymphocytes (TILs) images. The neural network 400 may include an 18-layer residual neural network (Resnet18) having a convolutional network architecture. For example, five groups of convolutional layers arranged in residual blocks may extract the T-cell infiltration patterns from the TIL maps discussed above. That is, infiltration patterns or features of the TIL with respect to the tumor are extracted from the TIL maps 405. That is, these extracted features objectively quantify the TIL infiltration patterns of the TIL with respect to the tumor. Although item 405 is written as "Image 2224×224", the image may be different, such as 224×224.

Continuing to refer to FIG. 4, the first group of the five groups of convolutional layers may contain an initial convolution layer 410 and a pooling layer 415, such as a max-pooling layer. The convolution layer 410 may use a 7×7 kernel size, and the pooling layer 415 use a 3×3 kernel size. The second group of the five groups of convolutional layers may contain two residual blocks 420, 425, wherein each residual block contains two layers, and wherein each layer uses 3×3 (64) kernels. The third group of the five groups of convolutional layers may contain two residual blocks 430, 435, wherein each residual block contains two layers, and wherein each layer uses 3×3 (128) kernels. The fourth group of the five groups of convolutional layers may contain two residual blocks 440, 445, wherein each residual block contains two layers, and wherein each layer uses 3×3 (256) kernels. The fifth group of the five groups of convolutional layers may contain two residual blocks 450, 455, wherein each residual block contains two layers, and wherein each layer uses 3×3 (512) kernels.

Continuing to refer to FIG. 4, after undergoing processing of the five groups of convolutional layers, the neural network 400 produces one or more TIL infiltration patterns (e.g., matrix or matrices) that are representative of the features extracted from the neural network 400. These extracted features or patterns are passed through an average pooling layer 460 and a sequence of three fully connected layers 465, 470, 475 having 1000, 256 and 20 neurons, respectively. For example, the output of the fifth group of convolutional layers, particularly the output of residual block 455, includes an identification of a plurality of features from one image 405. The block identified as Avg pool (item 460) extracts the plurality of features by creating a 3×3 pool for each image and creating an average representation of the plurality of features from the subset(s) of each of the pools. The block identified as Fc 1000 (item 465) is a fully connected layer of the neural network that includes 1000 neurons (wherein each neuron each computing unit) used to group or classify the extract TIL infiltration features into a plurality of arbitrary patterns of TIL infiltration features. The block identified as FC 256 drop off (item 470) may be an optional step used to excludes a predetermined number or percentage (e.g., 10%, 20%, 30%, 40%, 50%, etc.) of the plurality of arbitrary patterns so as not to over-train the neural network 400.

Again, each TIL image obtained from the database 110 also includes data corresponding TIL and/patient survival time data. As such, each pattern derived from a TIL image has a known corresponding survival time. The patterns leaving the block identified as FC 256 drop off (item 470), therefore, have a corresponding survival time. The block identified as 20 discrete time (item 475) has a select, discrete or predetermined survival times (e.g., 10, 15, 20, 25, 30, 35, 40, 45, 50, etc.), which the neural network uses to identify and correlate with the patterns of TIL infiltration features. That is, item 475 of the neural network searches the plurality of arbitrary patterns of TIL infiltration features and identifies those patterns of TIL infiltration features having the same or substantially the same survival times as the select, discrete or predetermined survival times, thereby producing a time distribution of patterns of TIL infiltration features corresponding to survival time for each TIL image obtained from the database 110. Although the neural network 400 analyses one TIL image obtained from the database 110 at a time, it shall be understood that the method 100 and neural network 400 may create a plurality of images from each TIL image, and as such, the neural network 400 may analyze a plurality of images from each TIL image.

As discussed above, method 100, particularly Step 130 of method 100 performs pattern analysis of TIL maps using a convolutional neural network to extract TIL infiltration features and patterns thereof. Examples of TIL infiltration features may include those in the following Table 1.

TABLE 1

Definitions of terminology as used herein

| | |
|---|---|
| OS | Overall Survival Time of Patient (Patient Data) |
| −DLS $R_d$ | Minus or Negative Deep Learning System Risk of Death Score (risk score is negative correlation to overall survival (OS)) |
| TIL Number | The total number of infiltrated TIL in the tumor |
| <100 μm, <250 μm, <500 μm, <etc. | Number of TIL at specified infiltration depth, such as <100 μm, <250 μm, <500 μm, <etc. below the surface of the tumor |
| R < 100 μm, R < 250 μm, R < 500 μm, R < etc. | Ratio of TIL with such infiltration depth to total infiltrated TIL |
| Ball Hall | Ball-Hall index is a clustering index. |
| Banfield Raftery | Banfield-Raftery index is a clustering index. |
| TIL Percentage | The percentage of total number of infiltrated TIL relative to the total number of tumor cells |

Referring to Table 1, the OS represents the overall survival time of the patients corresponding to the TIL images obtained from the TCGA Skin Cutaneous Melanoma (SKCM) dataset obtained from database 110. The greater the OS, the greater the likelihood of patient survival. The algorithm of the present disclosure is first trained on a patient dataset and learns the relationship between TIL distribution patterns for patient sample images and patient survival time and creates a survival time distribution for such TIL distribution patterns, TIL infiltration features and/or a subset of TIL infiltration features. The trained algorithm is then transferred tumor spheroids for predicting patient survival while performing drug discovery and/or companion diagnostics.

The −DLS $R_d$ is the minus or Negative Deep Learning System (DLS) Risk of Death Score. The Risk of Death Score may be referred to as Risk Score ($R_d$), which is the negative correlation to overall survival (OS). That is, the $R_d$ for each patient is inversely correlated with patient survival because patient survival and directly related to the OS. The way in which the $R_d$ may be calculated or determined is discussed in more detail below.

Ball-Hall index is a clustering index. For the purposes of this disclosure, the Ball-Hall index is a clustering index that is indicative of a clustering index of the T-cells. Specifically, the Ball-Hall index is a mean dispersion of a cluster and is the mean of the squared distances of the points of the cluster with respect to their barycenter. The Ball-Hall index is the mean, through all the clusters, of their mean dispersion.

$$C = \frac{1}{K}\sum_{k=1}^{K}\frac{1}{n_k}\sum_{i \in I_k}\|M_i^{(k)} - G^{(k)}\| \quad \text{(Equation 1)}$$

In the particular case where all the clusters have the same size N/K, this sum reduces to 1/N*WGSS.

The Banfield-Raftery index is another clustering index. For the purposes of this disclosure, the Banfield-Raftery index is a clustering index of the T-cell clusters. This index is the weighted sum of the logarithms of the traces of the variance-covariance matrix of each cluster. The index can be written like the following:

$$C = \sum_{k=1}^{} n_k \log\left(\frac{Tr(WG^{(k)})}{n_k}\right) \quad \text{(Equation 2)}$$

The quantity $$\frac{Tr(WG^{(k)})}{n_k}$$

can be interpreted as the mean of the squared distances between the points in cluster $C^k$ and their barycenter $G^{\{k\}}$. If a cluster contains a single point, this trace is equal to 0 and the logarithm is undefined.

Referring again to FIG. 1, Step 130 uses the neural network to search the plurality of arbitrary patterns of TIL infiltration features, identify those patterns of TIL infiltration features having the same or substantially the same survival times as the select, discrete or predetermined survival times, and produce a time distribution of patterns of TIL infiltration features corresponding to survival time for each TIL image obtained from the database 110. Steps 115 to 130 are repeated to optimize the algorithm. That is, the algorithm, particularly the neural network 400, may comprise one or more weights assigned to one or more or each of the layers or blocks within the layers of the neural network, and those weights can be finetuned over a series of epochs. For example, model weights of modified fully connected layers can be initialized using the variance scaling method, and applying a weight decay to the fully connected layers during training (decay rate=0.1). Models can be trained for 30 epochs, wherein 1 epoch is one complete cycle through all training samples using mini-batches consisting of a discrete (e.g., 16) image samples each. Minibatch samples can be random assigned at the beginning of each epoch for robustness. During training, a single area can be sampled from each image, and these sampled areas can be treated as semi-independent training samples. Each sample can be labeled with the corresponding patient outcome for training, duplicating outcomes for patients that preserved multiple slides. The areas can be sampled randomly at the beginning of each training epoch and regarded as an entirely new set of samples. These sample areas can be randomly transformed to improve the robustness to account for tissue orientation, color variations, and anisotropy. As such, after performing steps 115 to 130, these steps or any subset thereof can be repeated with additional sample images or different areas of the images to optimize the algorithm.

Further optimization be accomplished by minimizing the negative log-likelihood via backpropagation to optimize model weights of fully connected layers of the neural network 400. For example, the loss function may be applied to optimize algorithm between predicted survival time and actual survival time from clinical data, wherein the loss function is configured to minimize the negative mean log likelihood of between the predicted survival time and actual survival time via backpropagation to optimize model weights and biases, and output a modified survival time distribution for the subset(s) of TIL behavior infiltration features, wherein the survival time distribution represents a correlation between survival time and TIL infiltration features or patterns of such features.

Continuing to refer to FIG. 1, step 130 of method 100 includes learning the relationship(s) between patient outcomes, such as survival time, and the image-extracted TIL infiltration features with fully connected neural networks. Fully connected layers perform additional transformations on these extracted features, and then, a final discrete time model layer outputs a prediction of patient survival over discrete time points. The interconnection weights are trained by comparing survival likelihood predicted by the neural network with time-to-event outcomes using a backpropagation technique to optimize the negative mean log-likelihood of the neural network.

Referring again to FIG. 4, the terminal fully connected layer outputs a prediction of survival likelihood distribution over twenty (20) discrete time point $\phi(x)=\{\phi_1(x), \phi_2(x), \ldots, \phi_{20}(x)\}$ associated with the input TIL image from the database 110, where x represents the inputs to the neural network. Each time is associated with a pattern of TIL infiltration features extracted from the TIL images by the neural network 400.

Referring again to FIG. 4, a survival function tries to predict same time using different image data. That is, steps 115-130 are used to initially train the neural network and assign weights using certain images from the database 110. Then the algorithm obtains different or newer TIL images from the database 110 and applies the trained algorithm using the newer TIL image(s) to predict the patient survival time as seen if Step 135 of FIG. 1. This so-called prediction step—Step 135—is used to validate the neural network and its weights.

Continuing to refer to FIG. 1, method 100 includes Step 140, which includes applying a loss function to the identified pattern(s) of extracted TIL features, based on a plurality of TIL images, to produce a modified survival time distribution for the pattern(s) of extracted TIL infiltration features to minimize the negative mean log likelihood of between predicted survival time and actual via backpropagation to optimize model weights and biases. To ensure the final likelihood are in the range of 0 to 1, a conditional probability function is applied to the outputs of the neural network. The final conditional probabilities distribution (determined using a hazard function) is:

$$h(\tau_j|x) = \frac{1}{1 + \exp[-\phi_j(x)]} \quad \text{(Equation 3)}$$

where $\tau_j \in R^{20} (0 = \tau_0 < \tau_1 < \ldots < \tau_{20})$ represent the discrete time point.

To provide an error signal for backpropagation, these predicted survival time likelihoods are input a loss function to calculate the negative mean log likelihood.

$$oss = -\frac{1}{n}\sum_{i=1}^{n}\left(d_i \log[\sigma_{k(t_i)}(t_i)(\phi(x_i))] + \right.$$

$$\left. (1-d_i) \log\left[\sum_{k=\kappa(t_i)+1}^{20+1} \sigma_k(\phi(x))\right]\right) \quad \text{(Equation 4)}$$

where n is the size of the training dataset, $\kappa(t) \in \{0, \ldots, 20\}$ defines the corresponding discrete time index of each sample, and $$\sigma_j(\phi(x)) = \frac{\exp[\phi_j(x)]}{1 + \sum_{k=1}^{20} \exp[\phi_k(x)]}, j \in \{0, \ldots, 20\} \quad \text{(Equation 5)}$$

The loss is the mean negative log likelihood calculated by predicted survival time functions and true survival times from patients. In the training algorithm of the present disclosure, the loss function can be used to minimize the negative log likelihood via backpropagation to optimize model weights of fully connected layers. As such, the method in FIG. 1 combines elements of a neural network with a loss model to predict time-to-event data from TIL images and produce a modified survival time distribution for TIL infiltration features observed from the TIL images, as seen in Step 145, and optimized by adjusting the model weights of the layers of the neural network to minimize the negative log likelihood via backpropagation.

The method(s) of the present disclosure is unique because it is to first to train and algorithm and neural network on patient data, and subsequently apply the trained algorithm and neural network to clinically obtained 3D tumor culture screening systems. One of the primary purposes of machine learning algorithm and neural network includes correlating patient TIL behavior with patient survival.

Figure 2:
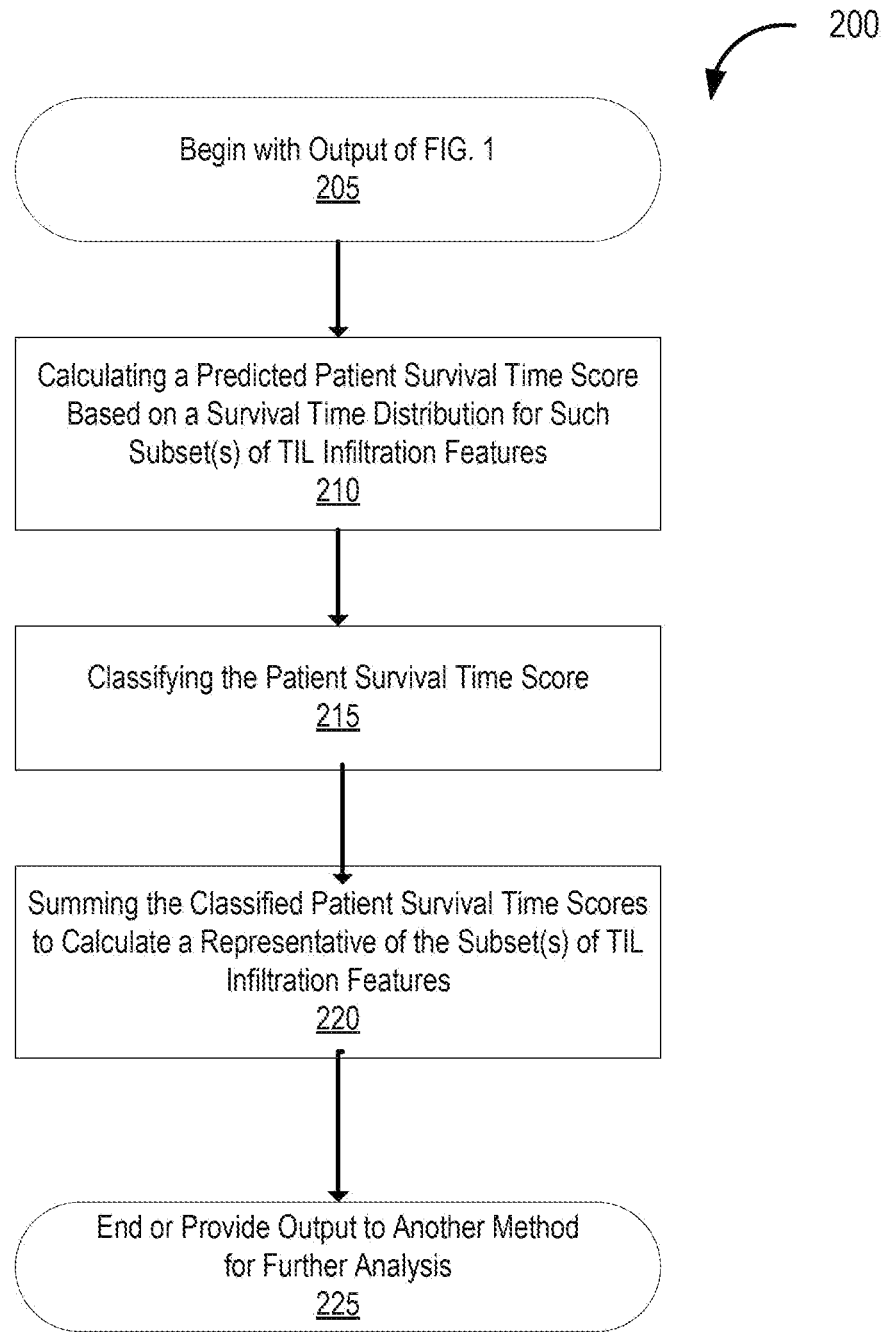
FIG. 2 is an illustration of a flow diagram for calculating a predicted survival time score of the TIL based on the survival time distribution of FIG. 1.

Referring to FIG. 2, there is depicted a flow diagram a method 200 for calculating a predicted patient survival time or drug score based on trained algorithm discussed above with respect to FIG. 1. Method 200 begins with the output of FIG. 1 as Step 205. Step 215 includes calculating a patient survival time score ($R_d$) based on survival time distribution. The $R_d$ may be a scalar $R_d$, which may be the negative of the expectation over the predicted time interval likelihood distribution. To improve the robustness and stability of the $R_d$ predictions, a sampling and risk filtering technique may be applied to the calculation. For example, (i) a predetermined (e.g., 9) number of areas of each image or tissue sample may be first sampled from image slides corresponding to each patient. (ii) The $R_d$ of each sample for each patient may then predicted using the neural network discussed above. (iii) The median $R_d$ of predetermined (e.g., 9) number of predictions from samples may then calculated as the final risk prediction for the patient.

Since the accuracy of the neural network can vary significantly from one epoch to another, largely due to the training sampling and randomized minibatch assignments, a model-averaging technique may be used to reduce prediction variance. To obtain final risk predictions for the testing patients that are stable, performing model averaging using the models from a predetermined number (e.g., 5) of consecutive or discontinuous epochs. For example, if 30 epochs are used, epochs 26 to 30 may smooth variations across epochs and increase stability. The model-averaged patient survival time score (Rd) for patient m may, therefore, be calculated as follows:

$$\overline{R_d^*} = \frac{1}{5}\sum_{\gamma=26}^{30} R_{d(\gamma)}^* \quad \text{(Equation 6)}$$

where $R^*_{d(\gamma)}$, denotes the predicted risk for patient m in training epoch, $\gamma$.

Once the predicted $R_d$ is determined, the predicted $R_d$ for each patient can be classified as depicted in Step 215 of FIG. 2. For example, $R_d$ can be defined as high, medium, and low-survival groups by binning the $R_d$'s by or into risk classifications or categories, such as low survival, medium survival and high survival. Low survival may mean the $R_d$>75% of TCGA SKCM patient dataset; medium survival may mean $R_d$=25%-75% of TCGA SKCM patient dataset; and high survival may mean $R_d$<25% of TCGA SKCM patient dataset. Each risk classification or category may be associated with a predetermined values, such as 0 for low survival (high risk), 1 for medium survival (medium risk), and 2 for high survival (low risk). To filter the effects of individual TILs, a function, such as summing, may be applied to the values for a predetermined number (e.g., 10) of the images associated with the one or more TILs, thereby calculating a final score representative of the impact of the one or more TILs, as seen if Step 220 of method 200.

The trained neural network as described in FIG. 1 and FIG. 4 is transferred to 3D tumor culture dataset 305, a drug screening method and/or a companion diagnostic method 300 may be performing using the algorithms discussed above with respect to FIGS. 1, 2 and 4 to objectively quantify and predict/score the effectiveness of a drug or a treatment based on a particular type of TIL behavior within 3D tumor cultures or patent tumor tissue samples. For example, a library of 141 small molecule epigenetic modulators in 2 cancer cell lines (e.g., B16F10 melanoma and UN-KC6141 pancreatic cancer) were screened.

GSK-LSD1, a lysine-specific histone demethylase 1 inhibitor (LSD1i), was identified as a potential lead compound that may enhance T cell infiltration synergize with anti-PD1 treatment. As shown in FIG. 6, the final score for GSK-LSD1 was calculated for each drug by averaging the scores of a total of 10 images ranked as top candidate because it had the highest score, which is indicative of demonstrating the best T cell infiltration enhancement activity in both B16F10 melanoma cell line and UN-KC6141 pancreatic cancer cell line-based screens. The numbers of the scores can also be visually represented using different colors, for example green for the lower scores and red for the higher scores, with the scores in between represented by different shades of intermediate colors such as yellow-green, yellow, orange, etc.

Figure 3:
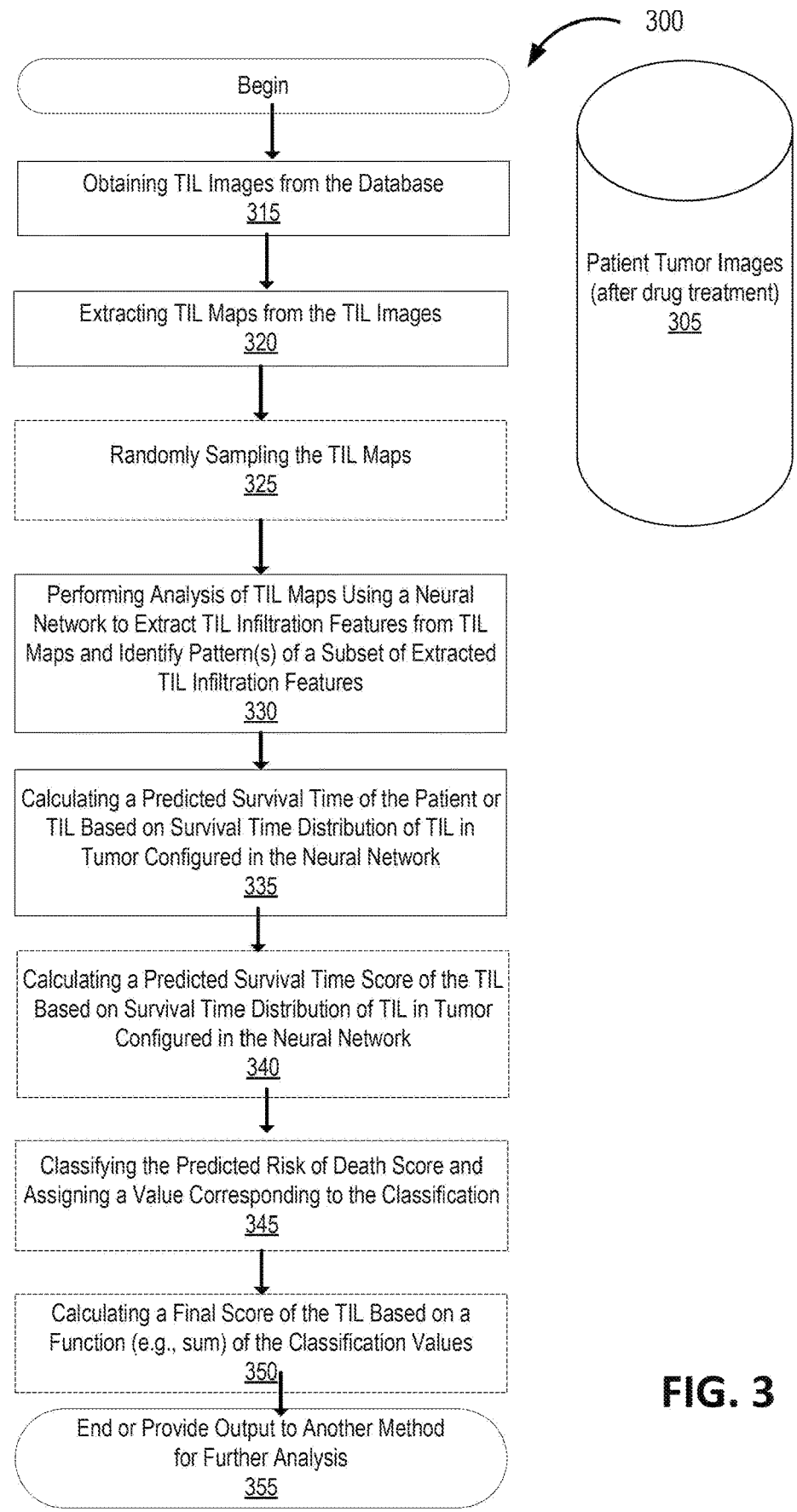
FIG. 3 is an illustration of a flow diagram for performing drug screening or companion diagnostics based on an algorithm that the survival time distribution indicative of the effectiveness of a TIL tumor infiltrating altering agent on a particular type of 3D tumor and immunocytes.

Referring again to FIG. 3, there is shown a method for performing drug screening using a plurality of patient tumor images obtained after the respective tumors were treated by different drugs or agents. Step 315 includes receiving a plurality of images, wherein each of the plurality of images comprises one or more immunocytes, such as TILs, in a tissue culture, such as a tumor. Step 320 includes creating a plurality of multi-color maps from the plurality of images, wherein first color represents the one or more immunocytes and the second color represents the tissue culture. Step 325 includes randomly sampling the plurality of images. Step 330 includes performing analysis of the plurality of multi-color maps using a neural network to extract a plurality of immunocyte infiltration features from the plurality of multi-color maps, wherein the neural network comprises a survival time distribution representative of a relationship between a survival time of a patient and a subset of the plurality of immunocyte infiltration features or a pattern of the subset of the plurality of immunocyte infiltration features, wherein the neural network comprises weights and/or biases that have been assigned as a result of a loss function having minimized a negative mean log likelihood between a predicted time and an actual time via backpropagation. Step 335 includes calculating a predicted patient survival time of the patient based on a correlation between the plurality of immunocyte infiltration features from the plurality of multi-color maps and the survival time distribution.

Step 340 includes receiving two or more images, wherein each of the two or more images are representative of two immunocytes in a similar tissue culture, respectively, and calculating the predicted patient survival time with respect to each of the two immunocytes, and identifying the greater of the predicted patient survival times, and calculating a predicted patient survival time score for each of the predicted patient survival times. Step 345 includes classifying each of the predicted patient survival time scores into respective classifications and assigning respective classification values. Step 350 includes calculating a final score of each of the two immunocytes based on a function (e.g., sum) of the classification values.

Figure 5:
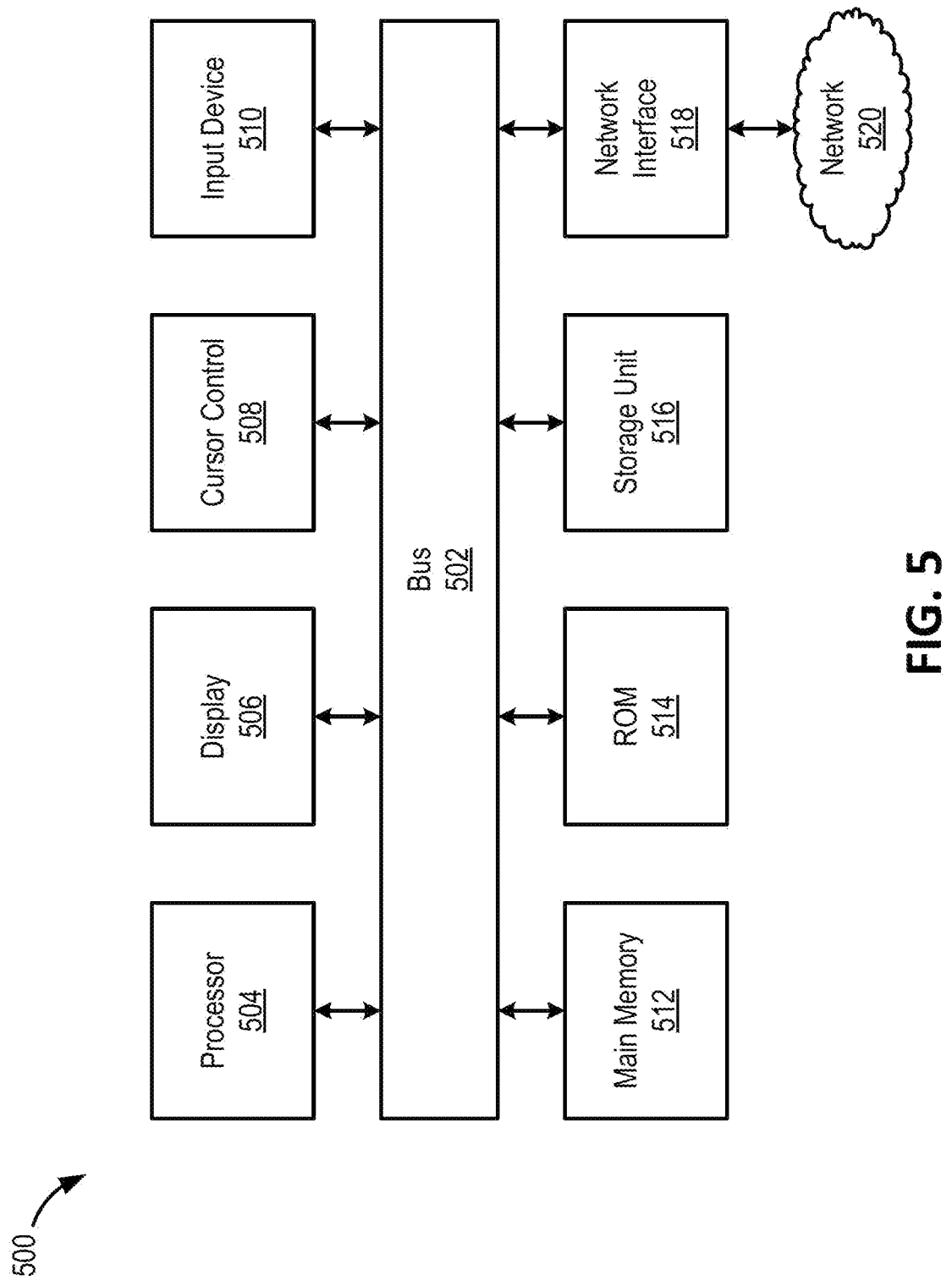
FIG. 5 is an illustration of a block diagram of an example computer system which may be used to implement all or certain or a combination of the methods illustrated in FIGS. 1-4 and/or implement all or certain or a combination of aspects of the examples discussed herein.

FIG. 5 is an illustration of a block diagram of an example computer system which may be used to implement all or certain or a combination of the methods illustrated in FIGS. 1-3 and 4 and/or implement all or certain or a combination aspects of the examples discussed herein. For example, some or all of the methods 100, 200, and/or 300 may be performed using the computer system 500. This diagram is merely an example, which should not unduly limit the scope of the claims. One of ordinary skill in the art would recognize many variations, alternatives, and modifications.

The computing system 500 includes a bus 502 or other communication mechanism for communicating information between, a processor 504, a display 506, a cursor control component 508, an input device 510, a main memory 512, a read only memory (ROM) 514, a storage unit 516, and/or a network interface 518. In some examples, the bus 502 is coupled to the processor 504, the display 506, the cursor control component 508, the input device 510, the main memory 512, the ROM 514, the storage unit 516, and/or the network interface 518. And, in certain examples, the network interface 518 is coupled to a network 520. The memory may be any suitable non-transitory computer readable medium, for example.

In some examples, the processor 504 includes one or more general purpose microprocessors. In some examples, the main memory 512 (e.g., random access memory (RAM), cache and/or other dynamic storage devices) is configured to store information and instructions to be executed by the processor 504. In certain examples, the main memory 512 is configured to store temporary variables or other intermediate information during execution of instructions to be executed by processor 504. For example, the instructions, when stored in the storage unit 516 accessible to processor 504, render the computing system 500 into a special-purpose machine that is customized to perform the operations specified in the instructions (e.g., the instructions stored in the components 300). In some examples, the ROM 514 is configured to store static information and instructions for the processor 504. In certain examples, the storage unit 516 (e.g., a magnetic disk, optical disk, or flash drive) is configured to store information and instructions.

In some embodiments, the display 506 (e.g., a cathode ray tube (CRT), an LCD display, or a touch screen) is configured to display information to a user of the computing system 500. In some examples, the input device 510 (e.g., alphanumeric and other keys) is configured to communicate information and commands to the processor 504. For example, the cursor control 508 (e.g., a mouse, a trackball, or cursor direction keys) is configured to communicate additional information and commands (e.g., to control cursor movements on the display 506) to the processor 504.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all the described features. Accordingly, the scope of the present disclosure is intended to embrace all such alternatives, modifications, and variations as fall within the scope of the claims, together with all equivalents thereof.

What is claimed is:

1. A non-transitory computer readable medium having a computer program stored thereon for identifying and/or determining relationships and/or patterns between patient survival and one or more tumor infiltrating lymphocytes (TILs) within a tumor, the computer program comprising instructions for causing one or more processors to:
   receive a plurality of first images, wherein each of the plurality of first images comprises one or more TILs in a three-dimensional tumor tissue;
   receive actual patient survival time data associated with each of the plurality of first images;
   create a plurality of multi-color maps from the plurality of first images, wherein a first color represents the one or more TILs and a second color represents the three-dimensional tumor tissue;
   process a plurality of multi-color maps via a neural network, wherein the neural network identifies TIL features in each of the plurality of multi-color maps, creates a plurality of patterns of the TIL features, correlates actual survival time to the TIL features or patterns of features, and produce a survival time distribution for the TIL features or patterns TIL (behavior) features;
   calculate a predicted survival time using the neural network; and
   apply a loss function to optimize the neural network, wherein the loss function is configured to minimize a negative mean log likelihood between the predicted survival time and the actual survival time via backpropagation to optimize model weights and biases within the neural network and produce a modified survival time distribution for the TIL features of patterns TIL behavior features, wherein the modified survival time distribution represents a correlation between survival time and the TIL features or patterns of TIL features.

2. A method for identifying and/or determining relationships and/or patterns between patient survival and one or more tumor infiltrating lymphocytes (TILs) within a tumor, the method comprising the steps of:
   receiving a plurality of images, wherein each of the plurality of images comprises one or more TILs in a three-dimensional tumor tissue;
   receiving patient survival time data associated with each of the plurality of images;
   creating a plurality of multi-color maps from the plurality of images, wherein first color represents the one or more TILs and the second color represents the three-dimensional tumor tissue;
   performing analysis of the plurality of multi-color maps using a neural network to extract a plurality of TIL infiltration features from the plurality of multi-color maps; and
   processing a plurality of multi-color maps via a neural network, wherein the neural network identifies TIL features in each of the plurality of multi-color maps, creates a plurality of patterns of the TIL features, correlates actual survival time to the TIL features or patterns of features, and produce a survival time distribution for the TIL features or patterns TIL (behavior) features;
   calculating a predicted survival time using the neural network; and
   applying a loss function to optimize the neural network, wherein the loss function is configured to minimize a negative mean log likelihood between the predicted survival time and the actual survival time via backpropagation to optimize model weights and biases within the neural network and produce a modified survival time distribution for the TIL features of patterns TIL behavior features, wherein the modified survival time distribution represents a correlation between survival time and the TIL features or patterns of TIL features.

3. The method of claim 2, further comprising calculating a predicted patient survival time score based on the survival time distribution.

4. The method of claim 3, further comprising the step of classifying the score into one of a plurality of classifications.

5. The method of claim 4, further comprising the step of assigning a value corresponding to classification of the score.

6. The method of claim 5, further comprising the step of summing the values for a predetermined number of the images associated with the one or more TILs, thereby calculating a final score representative of the impact of the one or more TILs.

7. A non-transitory computer readable medium having a computer program stored thereon for performing drug screening, the computer program comprising instructions for causing one or more processors to:
   receive a plurality of images, wherein each of the plurality of images comprises one or more immunocytes in a tissue culture;
   create a plurality of multi-color maps from the plurality of images, wherein first color represents the one or more immunocytes and the second color represents the tissue culture;
   perform analysis of the plurality of multi-color maps using a neural network to extract a plurality of immunocyte infiltration features from the plurality of multi-color maps, wherein the neural network comprises a survival time distribution representative of a relationship between a survival time of a patient and a subset of the plurality of immunocyte infiltration features or a pattern of the subset of the plurality of immunocyte infiltration features, wherein the neural network comprises weights and/or biases that have been assigned as a result of a loss function having minimized a negative mean log likelihood between a predicted time and an actual time via backpropagation, and
   calculate a predicted patient survival time of the patient based on a correlation between the plurality of immunocyte infiltration features from the plurality of multi-color maps and the survival time distribution.

8. The non-transitory computer readable medium of claim 7, wherein the computer program further comprises instructions for calculating a predicted patient survival time score based on predicted patient survival time.

9. The non-transitory computer readable medium of claim 8, wherein the computer program further comprises instructions for causing one or more processors to classify the predicted patient survival time score into one of a plurality of classifications.

10. The non-transitory computer readable medium of claim 8, wherein the computer program further comprises instructions for causing one or more processors to assign a value corresponding to classification of the predicted patient survival time score.

11. The non-transitory computer readable medium of claim 1, wherein the computer program further comprises instructions for causing one or more processors to sum the values for a predetermined number of the images associated with the one or more immunocyte infiltration features, thereby calculating a final score representative of the impact of the one or more immunocyte infiltration features.

12. A method for performing drug screening, the method comprising the steps of:
receiving a plurality of images, wherein each of the plurality of images comprises one or more immunocytes in a tissue culture;
creating a plurality of multi-color maps from the plurality of images, wherein first color represents the one or more immunocytes and the second color represents the tissue culture;
performing analysis of the plurality of multi-color maps using a neural network to extract a plurality of immunocyte infiltration features from the plurality of multi-color maps, wherein the neural network comprises a survival time distribution representative of a relationship between a survival time of a patient and a subset of the plurality of immunocyte infiltration features or a pattern of the subset of the plurality of immunocyte infiltration features, wherein the neural network comprises weights and/or biases that have been assigned as a result of a loss function having minimized a negative mean log likelihood between a predicted time and an actual time via backpropagation, and
calculating a predicted patient survival time of the patient based on a correlation between the plurality of immunocyte infiltration features from the plurality of multi-color maps and the survival time distribution.

13. The method for performing drug screening of claim 12 further comprising the steps of:
receiving two or more images, wherein each of the two or more images are representative of two immunocytes in a similar tissue culture, respectively;
calculating the predicted patient survival time with respect to each of the two immunocytes; and
identifying the greater of the predicted patient survival times.

14. The method for performing drug screening of claim 13 further comprising the step of calculating a predicted patient survival time score for each of the predicted patient survival times.

15. The method for performing drug screening of claim 14 further comprising the step of classifying each of the predicted patient survival time scores into respective classifications.

16. The method for performing drug screening of claim 15 further comprising the step of assigning a value corresponding to the classifications of the predicted patient survival time scores.

* * * * *